United States Patent
Majumder

(10) Patent No.: US 11,909,937 B2
(45) Date of Patent: Feb. 20, 2024

(54) PROCESSING SYSTEM, PROCESSING APPARATUS, PROCESSING METHOD, AND STORAGE MEDIUM

(71) Applicant: KONICA MINOLTA, INC., Tokyo (JP)

(72) Inventor: Tanmoy Majumder, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/311,303

(22) Filed: May 3, 2023

(65) Prior Publication Data

US 2023/0362313 A1 Nov. 9, 2023

(30) Foreign Application Priority Data

May 6, 2022 (JP) ................................. 2022-076394

(51) Int. Cl.
*H04N 1/60* (2006.01)
*G06V 10/74* (2022.01)

(52) U.S. Cl.
CPC ............. *H04N 1/60* (2013.01); *G06V 10/761* (2022.01)

(58) Field of Classification Search
CPC .... G06F 18/214; G06F 18/22; G06F 18/2414; G06F 18/2415; G06F 18/40; G06F 18/2323; G06F 16/958; G06F 16/5838; G06F 21/6254; G06F 21/6263; G06F 16/2228; G06F 16/245; G06F 16/2453; G06F 16/285; G06F 16/3331; G06F 16/355; G06F 16/583; G06F 16/56; G06F 16/00; G06F 18/00; G06F 16/2246; G06F 16/2264; G06F 16/24578; G06F 16/248; G06F 16/283; G06F 3/011; G06F 3/012; G06F 3/013; G06F 16/51; G06F 16/5854; G06F 7/00; G06F 16/24532; G06F 16/73; G06F 16/9555; G06F 21/604; G06F 21/6245; G06F 2203/04806; G06F 3/0482; G06F 15/76; G06F 16/2465; G06F 16/535; G06F 16/83; G06F 16/9535; G06F 16/9536;
(Continued)

(56) References Cited

U.S. PATENT DOCUMENTS

2006/0251299 A1* 11/2006 Kinjo ..................... G06V 40/16
  382/118
2009/0059256 A1* 3/2009 Hasegawa .......... H04N 1/00442
  358/1.9

(Continued)

FOREIGN PATENT DOCUMENTS

JP 2020010104 A 1/2020

*Primary Examiner* — Negussie Worku
(74) *Attorney, Agent, or Firm* — BUCHANAN INGERSOLL & ROONEY PC

(57) ABSTRACT

A processing system includes a hardware processor. The hardware processor obtains first read data of a sample image for image data included in user desired job data for image formation, searches job data stored in a storage section for data of a similar image to an image included in the obtained first read data to detect the data of the similar image, outputs a list of the detected data of the similar image, causes an image forming apparatus to form an image based on selected data selected from the data included in the list, obtains second read data of the formed image, and performs color adjustment on the selected data based on the first read data and the second read data.

11 Claims, 8 Drawing Sheets

(58) Field of Classification Search
CPC ...... G06F 18/25; G06F 18/251; G06F 21/602; G06F 21/6227; G06F 2221/2107; G06F 3/04847; G06F 9/543; G06F 16/2365; G06F 16/24575; G06F 16/40; G06F 16/53; G06F 16/54; G06F 16/58; G06F 16/5846; G06F 16/5862; G06F 16/5866; G06F 16/7328; G06F 16/783; G06F 16/784; G06F 16/785; G06F 16/7854; G06F 16/903328; G06F 16/93; G06F 18/2178; G06F 18/28; G06F 21/32; G06F 21/6218; G06F 21/629; G06F 2221/2141; G06F 3/04842; G06F 3/0485; G06F 3/14; G06F 40/134; G06F 9/453; G06N 3/045; G06N 3/08; H04N 13/232; H04N 23/57; H04N 23/90; H04N 1/00244; H04N 2201/0094; H04N 23/70; H04N 1/00204; H04N 1/00236; H04N 1/00307; H04N 1/00355; H04N 1/00363; H04N 1/00374; H04N 1/00968; H04N 1/00973; H04N 2201/3249; H04N 2201/3269; H04N 2201/3273; H04N 2201/3278; H04N 2201/328; H04N 1/00222; H04N 1/00233; H04N 1/00421; H04N 1/00482; H04N 21/23424; H04N 21/4332; H04N 21/44008; H04N 21/812; H04N 21/8455; H04N 19/94; H04N 21/44016; H04N 21/4424; H04N 5/147; H04N 7/163; H04N 7/183; G06T 15/005; G06T 17/00; G06T 2207/10116; G06T 7/00; G06T 7/001; G06T 1/00; G06T 2207/10024; G06T 5/00; G06T 11/60; G06T 2207/10012; G06T 2207/10056; G06T 2207/10064; G06T 2207/10072; G06T 2207/10088; G06T 2207/10132; G06T 2207/30004; G06T 2207/30024; G06T 2207/30128; G06T 2207/30196; G06T 7/0002; G06T 7/0008; G06T 7/0014; G06T 7/90; G06T 2207/30201; G06T 2207/30204; G06T 7/0004; G06T 7/35; G06T 7/38; G06T 11/20; G06T 2207/10004; G06T 2207/10016; G06T 2207/20016; G06T 2207/20081; G06T 2207/20084; G06T 2207/30242; G06T 7/10; G06T 7/40; G06T 7/70; G06T 7/74; G06T 9/008; G06K 7/10

USPC .......................................................... 358/518

See application file for complete search history.

(56) References Cited

U.S. PATENT DOCUMENTS

| 2013/0010100 | A1* | 1/2013 | Kotaki | H01L 22/12 |
| | | | | 348/80 |
| 2018/0275936 | A1* | 9/2018 | Ayukawa | G06F 3/1234 |
| 2019/0182419 | A1* | 6/2019 | Sekiguchi | H04N 25/76 |
| 2021/0368050 | A1* | 11/2021 | Inoue | G06V 30/413 |
| 2021/0383572 | A1* | 12/2021 | Haba | G06F 16/5838 |
| 2022/0067957 | A1* | 3/2022 | Majumder | G06T 7/0002 |
| 2022/0272228 | A1* | 8/2022 | Tanaka | H04N 1/00822 |

* cited by examiner

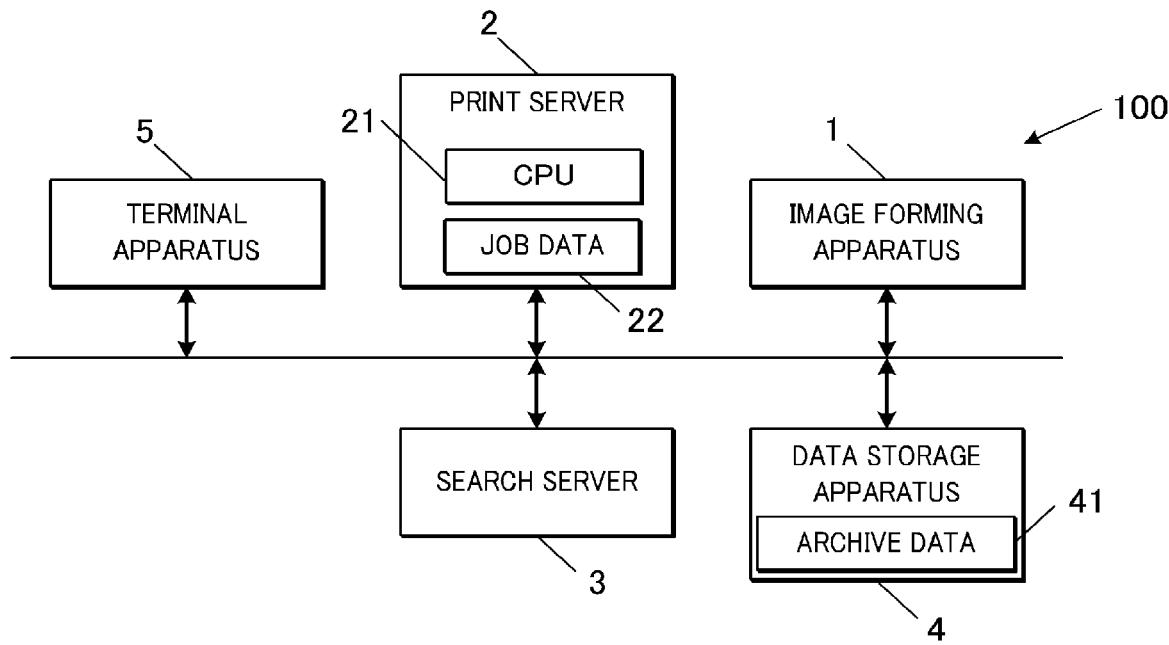
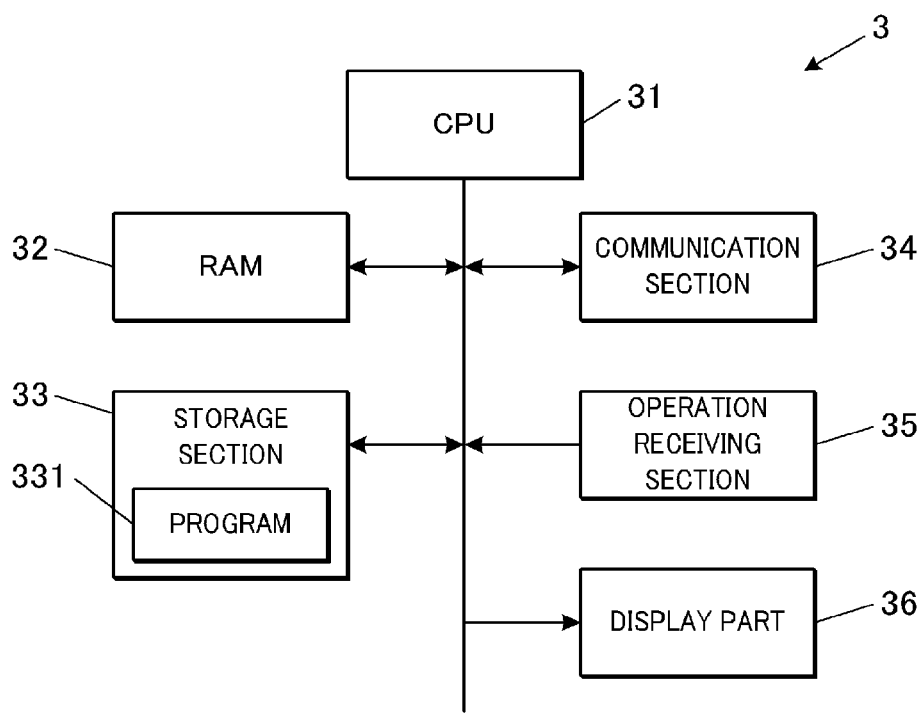

| | PARTIAL IMAGE COMPARISON | | | |
|---|---|---|---|---|
| | FILE | PAGE | UPDATE DATE AND TIME | IMAGE |
| ☑ | A | 3 | 2021/09/17 09:37:19 | |
| ☐ | C | 3 | 2021/09/10 17:27:39 | |
| ☐ | A | 4 | 2021/09/17 09:37:19 | |
| ☐ | B | 3 | 2021/02/07 10:22:10 | |

FIG. 8

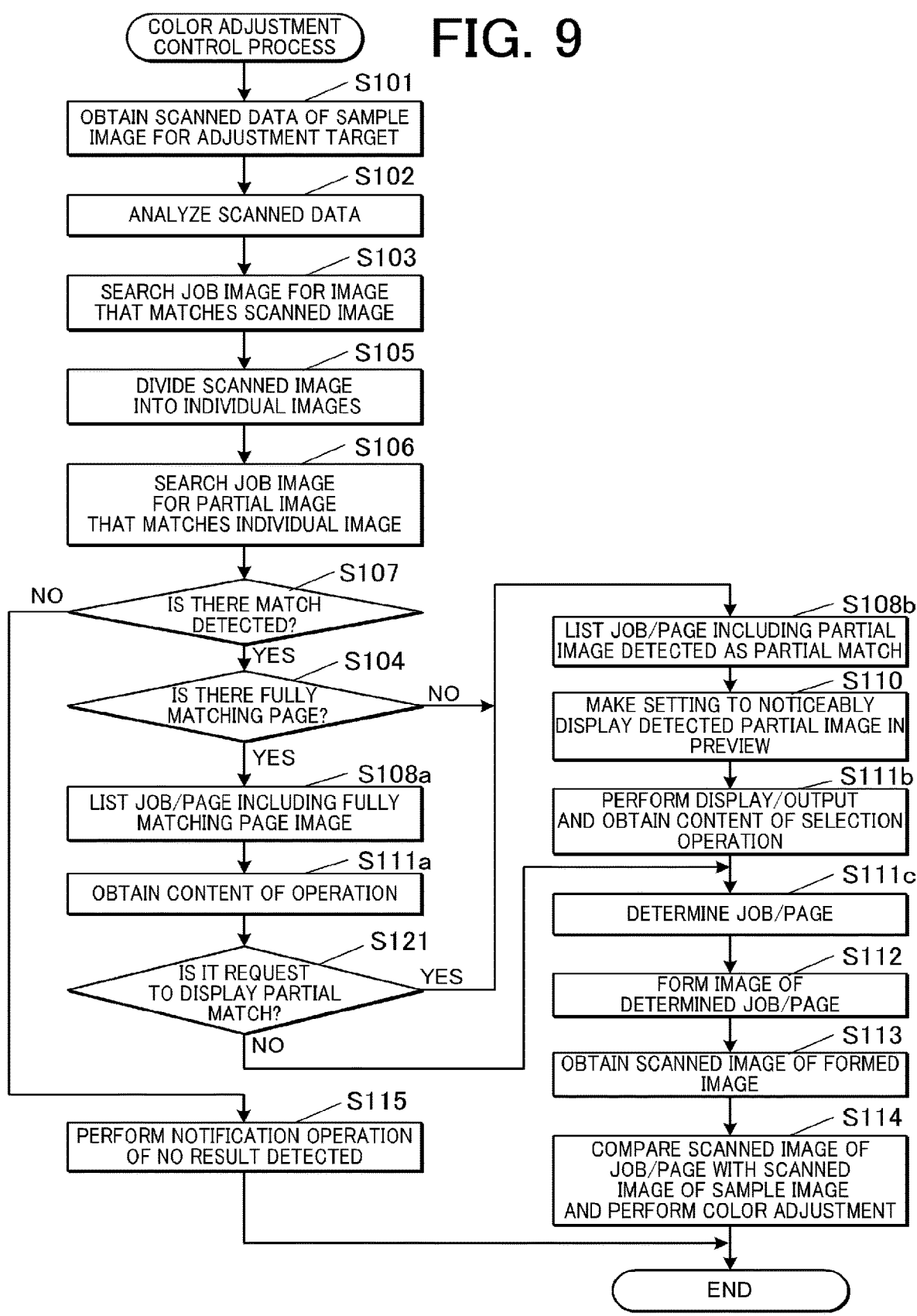

PROCESSING SYSTEM, PROCESSING APPARATUS, PROCESSING METHOD, AND STORAGE MEDIUM

REFERENCE TO RELATED APPLICATIONS

The entire disclosure of Japanese Patent Application No. 2022-076394, filed on May 6, 2022, including description, claims, drawings and abstract is incorporated herein by reference in its entirety.

TECHNICAL FIELD

The present invention relates to a processing system, a processing apparatus, a processing method, and a storage medium.

DESCRIPTION OF THE RELATED ART

There is an image forming apparatus that forms images having been subjected to high-precision calibration for industrial use or the like. The calibration in this image forming apparatus includes adjustment of colors of image data of a target to be formed to be colors of an actually formed image.

In many cases, job data including image data to be formed is transmitted to an image forming apparatus from an external computer via a network. At the time of color adjustment or actual image formation, the image forming apparatus selects and variously processes the received job data or part thereof, such as a page in image data. There is disclosed in Japanese Unexamined Patent Publication No. 2020-10104 a technology related to color matching in a case where there is a related color-adjusted job, such as an existing book of a series of books. The result obtained by color adjustment on such a related job is used to determine correspondence between brightness values of new image data and gradation distribution related to image formation, so that color matching is performed over the entire series.

SUMMARY OF THE INVENTION

However, a large amount of job data is often registered in an image forming apparatus that users access through computers. The registered job data are not always immediately adjusted or used. It takes time and effort to extract a desired image from images included in these job data at the time of execution of color adjustment or the like.

Objects of the present invention include providing a processing system, a processing apparatus, a processing method and a storage medium storing a program capable of more easily extracting desired image data from job data and performing color adjustment.

To achieve at least one of the abovementioned objects, according to a first aspect of the present disclosure, there is provided a processing system including a hardware processor that:
  obtains first read data of a sample image for image data included in user desired job data for image formation;
  searches job data stored in a storage section for data of a similar image to an image included in the obtained first read data to detect the data of the similar image;
  outputs a list of the detected data of the similar image;
  causes an image forming apparatus to form an image based on selected data selected from the data included in the list;
  obtains second read data of the formed image; and
  performs color adjustment on the selected data based on the first read data and the second read data.

To achieve at least one of the abovementioned objects, according to a second aspect of the present disclosure, there is provided a processing apparatus including a hardware processor that:
  obtains first read data of a sample image for image data included in user desired job data for image formation;
  searches job data stored in a storage section for data of a similar image to an image included in the obtained first read data to detect the data of the similar image;
  outputs a list of the detected data of the similar image;
  causes an image forming apparatus to form an image based on selected data selected from the data included in the list;
  obtains second read data of the formed image; and
  performs color adjustment on the selected data based on the first read data and the second read data.

To achieve at least one of the abovementioned objects, according to a third aspect of the present disclosure, there is provided a processing method including:
  obtaining first read data of a sample image for image data included in user desired job data for image formation;
  searching job data stored in a storage section for data of a similar image to an image included in the obtained first read data to detect the data of the similar image;
  outputting a list of the detected data of the similar image;
  causing an image forming apparatus to form an image based on selected data selected from the data included in the list;
  obtaining second read data of the formed image; and
  performing color adjustment on the selected data based on the first read data and the second read data.

To achieve at least one of the abovementioned objects, according to a fourth aspect of the present disclosure, there is provided a non-transitory computer-readable storage medium storing a program that causes a computer to:
  obtain first read data of a sample image for image data included in user desired job data for image formation;
  search job data stored in a storage section for data of a similar image to an image included in the obtained first read data to detect the data of the similar image;
  output a list of the detected data of the similar image;
  cause an image forming apparatus to form an image based on selected data selected from the data included in the list;
  obtain second read data of the formed image; and
  perform color adjustment on the selected data based on the first read data and the second read data.

BRIEF DESCRIPTION OF THE DRAWINGS

The advantages and features provided by one or more embodiments of the present disclosure will become more fully understood from the detailed description given hereinafter and the appended drawings, which are given by way of illustration only, and thus are not intended as a definition of the limits of the present disclosure, wherein:

FIG. 1 is an illustration for explaining the configuration of a processing system of the present embodiment;

FIG. 2 is a block diagram illustrating the functional configuration of a search server;

FIG. 4 is an example of a display screen where a result of the search is displayed;

FIG. 6 illustrates an example of the display screen where results of the partial search are displayed;

FIG. 8 illustrates an example of the display screen where the result of the full search and the results of the partial search are simultaneously displayed; and FIG. 9 is a flowchart illustrating another example of the color adjustment control process.

DETAILED DESCRIPTION

Figure 3:
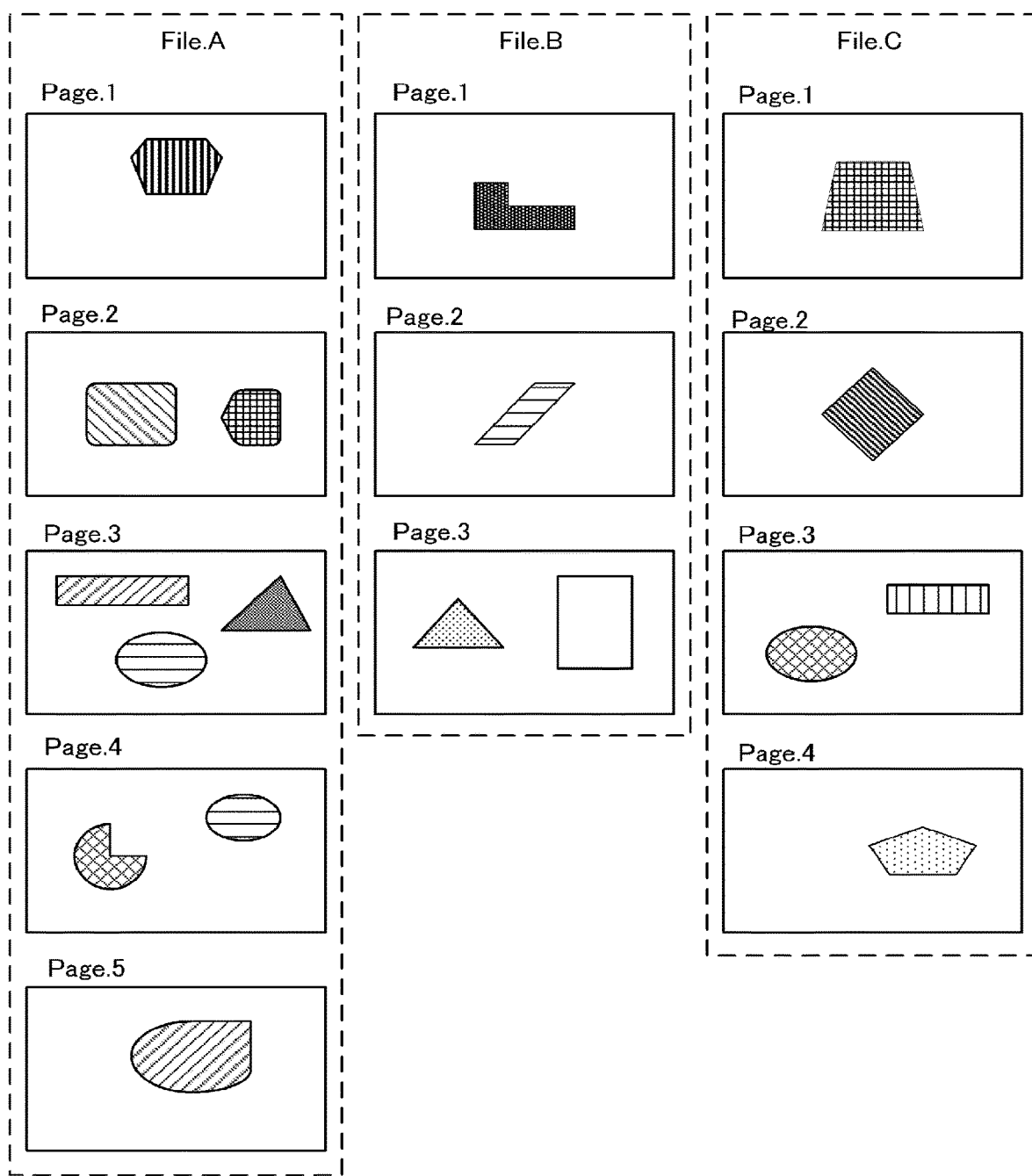
FIG. 3 illustrates an example of an image search (full search)

Hereinafter, embodiments of the present disclosure will be described with reference to the accompanying drawings.

FIG. 1 is an illustration for explaining the configuration of a processing system 100 of the present embodiment.

The processing system 100 includes an image forming apparatus 1, a print server 2, a search server 3, a data storage apparatus 4, and a terminal apparatus(es) 5.

The image forming apparatus 1 includes an image forming section that obtains job data including data of an image(s) to be formed and setting information relating to a forming operation and forms the image with a color material (s). The data of the image to be formed (image data) included in the job data may include data of a plurality of pages. The image forming apparatus 1 is, for example, of an electrophotographic type, but is not limited thereto. The image forming apparatus 1 may be of another type, for example, an inkjet type. The image forming apparatus 1 of the present embodiment can perform a scan operation of reading an image on a target medium surface (mainly, a paper surface) by capturing (imaging) the image and generating read image data. Therefore, the image forming apparatus 1 includes, for example, a known visible light line sensor such as a CCD sensor or a CMOS sensor. The visible light line sensor captures an image of each wavelength band of RGB, so that the image forming apparatus 1 can obtain color image data.

The print server 2 includes a CPU 21. The CPU 21 obtains job data 22 from the external terminal apparatuses 5. The CPU 21 processes and adjusts image data into a form suitable for image formation as necessary. The CPU 21 controls the order of image formation and sequentially outputs the job data 22 to the image forming apparatus 1.

The search server 3 searches for and extracts data including data of an image(s) that matches a searching image from the job data 22 obtained in the past and held by the print server 2 and archive data 41 held by the data storage apparatus 4.

The data storage apparatus 4 obtains job data related to image formation performed in the past from the print server 2 and holds the job data as the archive data 41 for an appropriate period and/or by an appropriate amount.

Each terminal apparatus 5 is an electronic calculator such as a personal computer (PC), a tablet terminal, or a portable terminal (smartphone), and can be connected to a network to request image formation from the image forming apparatus 1.

Note that some or all of the components of the processing system 100 other than the terminal apparatuses 5 may be the same in hardware. That is, for example, the print server 2 and the search server 3 may be the same computer to operate in an integrated manner.

FIG. 2 is a block diagram illustrating the functional configuration of the search server 3.

The search server 3 includes a CPU 31 (Central Processing Unit), a RAM 32 (Random Access Memory), a storage section 33, a communication section 34, an operation receiving section 35, and a display part 36.

The CPU 31 is a hardware processor that performs arithmetic processing and comprehensively controls the entire operation of the search server 3. The CPU 31 may be a single processor, or a plurality of processors that perform processing in parallel or perform processing independently depending on the application or the like.

The RAM 32 provides a working memory space for the CPU 31 and stores temporary data. The CPU 31 is not limited in particular, but is, for example, a DRAM. The temporary data includes, for example, image data searched for and detected in a job search process described below.

The storage section 33 is a nonvolatile memory that stores data. The storage section 33 includes, for example, a hard disk drive (HDD), a flash memory, or the like. The storage section 33 stores a program 331 and various types of setting data. The program 331 includes the job search process described below. The storage section 33 may be a component external to the search server 3, such as an externally attached peripheral apparatus, or a cloud server or a network drive on a network.

The communication section 34 controls communication with the outside in accordance with a predetermined communication standard. The communication standards include normal standards for a local area network (LAN), for example, TCP/IP. The communication section 34 may have a terminal for connecting a peripheral apparatus, for example, a universal serial bus (USB) terminal.

The operation receiving section 35 receives an input operation from the outside such as a user and transmits the input operation as an input signal to the CPU 31. The operation receiving section 35 includes, for example, some or all of a push button switch, a keyboard, a pointing device such as a mouse, and the like. The operation receiving section 35 may include a touch panel that overlaps the display part 36.

The display part 36 performs various kinds of display based on the control of the CPU 31. The display part 36 is, for example, a liquid crystal display screen (LCD), but is not limited thereto. The display part 36 may have an LED lamp for notifying a specific state including occurrence of an abnormality.

Some or all of the components of the operation receiving section 35 and the display part 36 may not be components of the search server 3, but may be peripheral apparatuses externally attached via the communication section 34. Alternatively, the search server 3 may be configured to only receive an input related to a process request from an external apparatus (terminal apparatus 5) via the communication section 34 and output information on display contents to the external apparatus via the communication section 34, and have only minimum components such as a reset button and an LED lamp as the operation receiving section 35 and the display part 36.

Next, an operation of searching for an image to be subjected to color adjustment (color adjustment target) will be described.

As described above, the image forming apparatus 1 forms a large number of images based on a plurality of job data 22 transmitted from a plurality of (a large number of) terminal apparatuses 5. In image formation for industrial use, in particular in a case where a large number of color images (photographs, paintings, diagrams, etc.) are included in a job image, usually, the user appropriately replaces and sets media on which images are formed and precise calibration (color adjustment) of color tones and/or density gradations are performed, before the images are finally formed. Therefore, image formation based on the job data 22 received and held by the print server 2 are not always performed immediately. The print server 2 can hold a large amount of job data 22 made by many users.

In such a case where a large amount of job data 22 are held in the print server 2, if color adjustment and image formation are performed sometime after a user transmits job data 22 to the print server 2, it may be difficult for the user to identify his/her desired job/page data. A file name is given to such job data 22 as appropriate, but often, the user does not correctly recognize the file name, the user forgets the file name, or the user forgets a correspondence relationship between the file name and images as its content.

Color adjustment is a process for a formed image in the image forming apparatus 1 to be similar to a sample image (actual object). As a comparison target, scanned data (first read data) obtained by causing an imaging apparatus (reading apparatus) to read a sample image is obtained Image data as a forming target in job data 22 is adjusted such that scanned data (second read data) of a formed image becomes similar to the abovementioned scanned data (criterion for adjustment).

Conventionally, scanned data of a sample image that is associated with image data to be subjected to color adjustment is obtained at the time when the image data is obtained. In contrast, the search server 3 of the present embodiment obtains scanned data of a sample image in advance, and uses it to search for and extract (detect) data of an image to be subjected to color adjustment from a large amount of job data (job data 22 and archive data 41) stored in storage sections of the print server 2 and the data storage apparatus 4 too. Note that the sample image may be part of an image(s) included in a certain page of job data as an image forming target.

FIG. 3 illustrates an example of an image search (full search). When a scanned image I0 of a sample image for color adjustment is obtained, the search server 3 determines whether or not images included in image data of job data stored in the print server 2 and the data storage apparatus 4 match the scanned image I0. In FIG. 3, three files of File. A to File. C are illustrated as examples, but in practice, more files may be searched.

An image (whole image) of each page of each file is compared with the scanned image I0. The comparison is performed in terms of the shape of the contour identified in each image by a known technique, for example, contour recognition, and the size, color, etc. in the contour. In a case where there is a plurality of colors, the degree of matching in terms of a histogram where brightness gradations are divided may be evaluated. The contour recognition may be performed by edge detection (Laplacian filter) or the like, or may be performed using a learned machine learning model or the like. Note that an angular difference between an image and a sample image due to the scanning operation of the sample image or the like is acceptable. The acceptable angular difference may include angular tilt, including 90 degree rotation, 180 degree rotation, etc. Page. 3 of File. A is detected as the one matching the scanned image I0. In the search, an image whose degree of similarity to the scanned image I0 (sample image) satisfies a predetermined criterion is extracted as a matching image. That is, no-matching to the extent that an image to be extracted is not excluded is acceptable. Examples include a slight difference in color tone, a slight difference in size due to an image taken into job data, and a distortion in shape accompanying reading of a sample image.

The scanning operation of the original data (sample image) does not need to be performed by the search server 3 itself by having a reading section. Scanned data (scanned image I0) of a sample image read by an external scanner (reading apparatus) or the like may be obtained. For example, data obtained through the scanning operation performed by a scanner included in the image forming apparatus 1 may be obtained. An apparatus or the like from which the scanned data is obtained may be registered/set. The scanned data may be obtained from the registered apparatus or the like in response to an obtainment request operation at the search server 3 or the like. Alternatively, the scanning operation may be performed by a registered reading apparatus in conjunction with the obtainment request for the scanned data.

Figure 4:
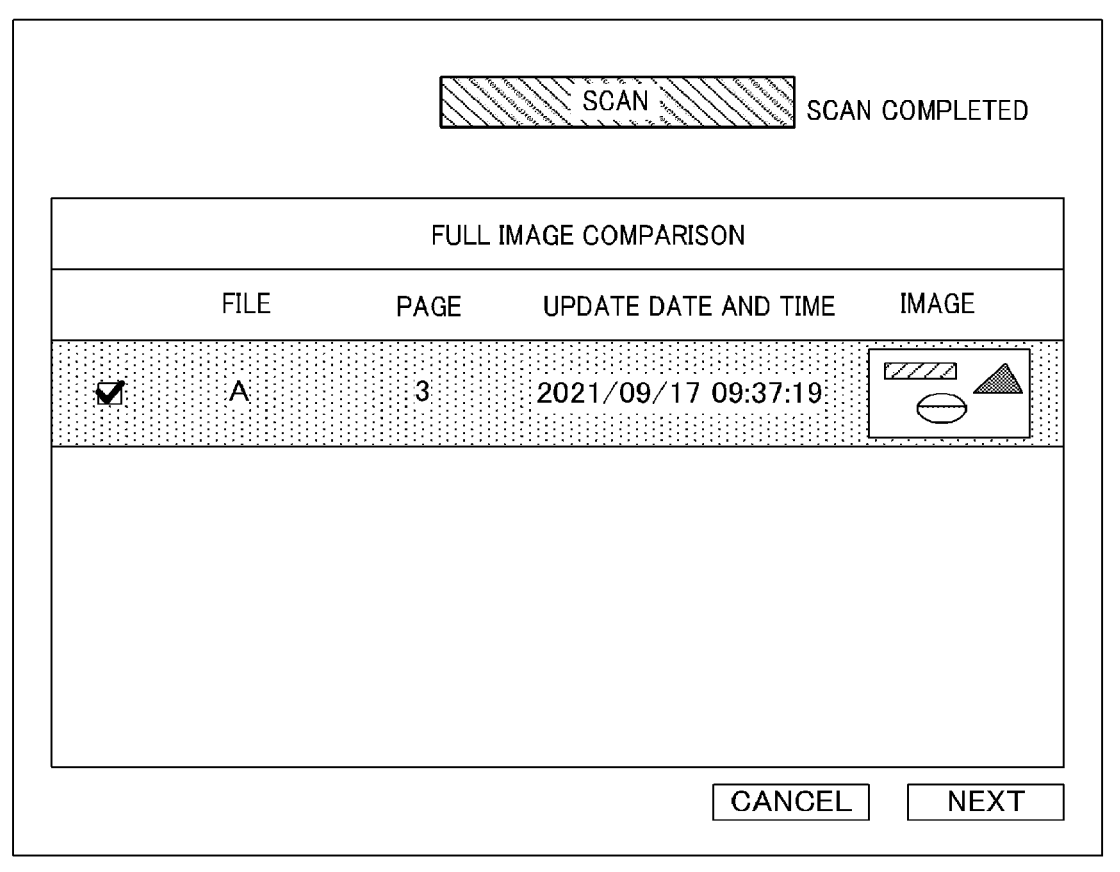

FIG. 4 is an example of a display screen where a result of the search is displayed.

As described above, this display screen may be displayed by the display part 36 of the search server 3. Alternatively, display data of the display screen may be transmitted to an external apparatus (terminal apparatus 5), and the display screen may be displayed by a display part of the terminal apparatus 5.

As described above, when the scanned image I0 is obtained, each page image of image data included in job data to be searched is compared with the scanned image I0 automatically, and a matching page image is extracted. As shown in FIG. 4, only the image (page image) of Page. 3 of File. A is displayed in a list as a page image (fully matching image or full match) that matches the full scanned image I0. Items displayed in the list include, for example, a file name, a page number, file update (obtainment) date and time and a preview of a page image, related to a job. Such a fully matching image is set as a default selecting target in advance, so that a checkmark indicating being selected is displayed in a checkbox at the left end. When the user performs an operation of selecting a "Next" button, the selecting target can be approved as it is.

There may be a case where data of a page image as an image forming target included in job data has been adjusted in image arrangement in the page as appropriate or is provided with a text such as an explanatory text. There may also be a case where of the scanned image I0 related to a sample image including a plurality of images (individual images), only some individual image(s) are included in a page image, and also be a case where a plurality of individual images in a sample image is divided and included in a plurality of pages. In these cases, a search may be performed in units of images rather than in units of pages.

In a case where in the read/scanned image I0, the contour recognized as described above is separable into a plurality of contours, that is, contours are separated from each other and are not in inclusion relation, the read scanned image I0 is divided for each contour and extracted as individual images. Similarly, when the print server 2 obtains job data, the search server 3 may analyze image data in the job data and generate data of partial images (partial image data) that are separable images divided. Note that in a case of an image including the background such as a photographic image, the object(s) captured in the photograph do not need to be separated to be individuals. The full photographic image may be treated as a partial image. In a case where the contour of an image is not closed, such as a case where a frame enclosing a figure is not closed, an area that is enclosed by a line circumscribing the contour extracted in the image and is exclusive from (does not overlap) the other partial images may be set as an area of a partial image. Characters (letters/text) may or may not be treated as an image(s). Among characters, only color characters and special font (decorative font, etc.) characters may be treated as an image(s). If at least one or more of characters are treated as an image(s), the entire area in which the character(s) is/are collectively written may be set as an area of a partial image. Partial image data once generated may be held in association with the original job data to be compared with a sample image. Thus, in the search process thereafter including the one(s) after the job data is archived/stored in the data storage apparatus 4, it is unnecessary to perform the image dividing process. The print server 2 may perform the dividing process of contours (partial images) in job data.

Whether or not such a partial image comparison/search (partial search) is performed may be based an input operation by the user or the like, and also switching between the partial search and the full search may be based thereon. The partial search may be performed only when no matching page image is extracted (detected) in the full page comparison/search (full search). Alternatively, the full search and the partial search are collectively performed, but when a fully matching page image extracted, pages including matching (similar) images extracted in the partial search may not be displayed in the list, for example. In these cases, switching of the type of search between the full search and the partial search may be automatically performed. Alternatively, the switching may be performed when a fully matching page is not obtained or an inappropriate result is obtained, for example, by the user selecting and operating the "Next" button without selecting a page using a checkbox at the left end.

That is, if the search server 3 can perform the partial search, whether or not the partial search is actually performed may be determined depending on the situation or settings.

Figure 5:
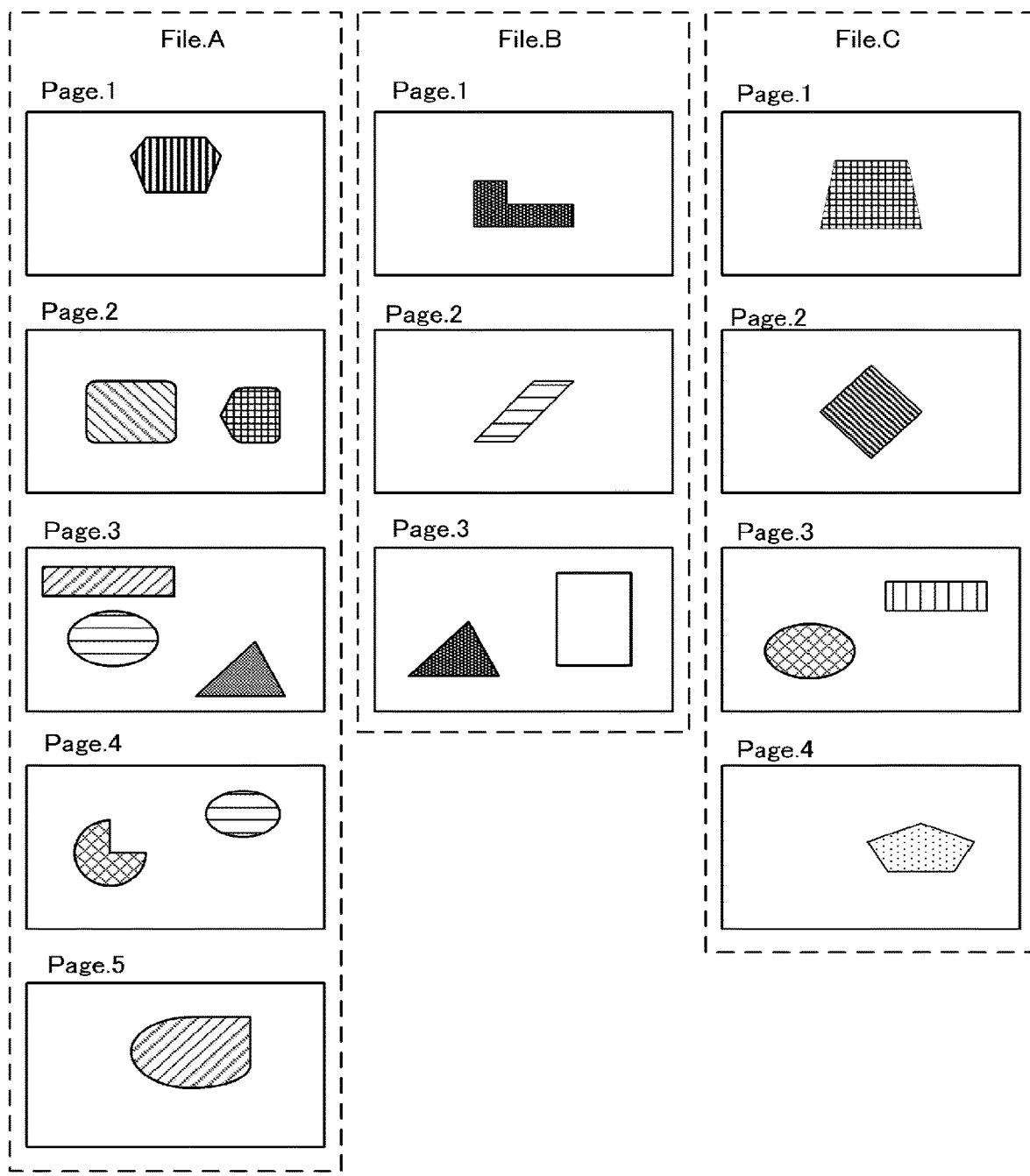
FIG. 5 is an illustration for explaining a partial search.

FIG. 5 is an illustration for explaining the partial search.

As described above, three images included in the scanned image I0 are divided as individual images that are individual images I0a to I0c for comparison. Like those shown in FIG. 3, the three partial images included in Page. 3 of File. A are extracted as images that respectively match the individual images I0a to I0c. Here, in the case of the partial search, the position of each partial image may not be taken into account. In FIG. 5, the positional relationship (including orientation) of the three partial images in the image of the page to be extracted is different from the positional relationship of the three individual images I0a to I0c in the scanned image I0. Therefore, in the full search, it is not determined that the scanned image I0 matches the image of Page. 3 of File. A. In the partial search, if three partial images respectively match the individual images I0a to I0c, its page image may be extracted as a full (exact) match regardless of the positional relationship.

Further, the two images included in Page. 3 of File. C have substantially the same shapes as and slightly different color tones from the individual images I0a and I0b, respectively. Still further, the left one of the two images included in Page. 3 of File. B is similar to the individual image I0c, and the right one of the images included in Page. 4 of File. A is similar to the individual image I0b. Thus, even if there is no fully matching image with all the three images, a page image having an image(s) that matches an image(s) of the three images may be selected as a partially matching image (partial match).

FIG. 6 illustrates an example of the display screen where results of the partial search are displayed.

As described above, in the partial search, a page (Page. 3 of File. A) including partial images that respectively match the individual images I0a to I0c is simply extracted as a page (image) that matches the three individual images I0a to I0c regardless of the positional relationship of the partial images. In the partial search, the above-described three pages, which are each a partial match (having the similarity equal to or higher than a criterion) including a partial image(s) that match(es) only part (one or two) of the three individual images I0a to I0c, are also extracted and displayed in the list. The display order can be descending order of the degree of similarity. As a method of quantitatively determining the degree of similarity, for example, the number of partial images that match the individual images I0a to I0c may be used. Items such as the shape, the size and the color tone may be prioritized to determine the degree of similarity and the display order of matches. Note that if an image is similar in an item but greatly different, namely, exceeds an acceptable range, in another item to and from a sample image, for example, is substantially the same in shape but significantly different in color as and from the sample image, the image is not regarded as a similar image. In FIG. 6, Page. 3 of File. C including partial images that match (similar to) two individual images I0a and I0b is displayed second. In a case where there are many pages similar to a sample image, the pages may be displayed in descending order of the degree of matching with the maximum number of pages to be displayed set.

In a preview image of each page displayed in the list, a matching partial image(s) may be displayed noticeably. In FIG. 6, a broken-line frame border is displayed for each matching partial image.

Note that if there is/are a partial match(es) only, it may mean that page data of an originally intended job has not been detected. For example, when a job that the user has intended to transmit has not been actually transmitted, page data of the job cannot be detected as a matter of course. In this case, the user may once cancel a process(es) related to color adjustment by selecting and operating a "Cancel" button. The user may then start over from the transmission of the job data.

Figure 7:
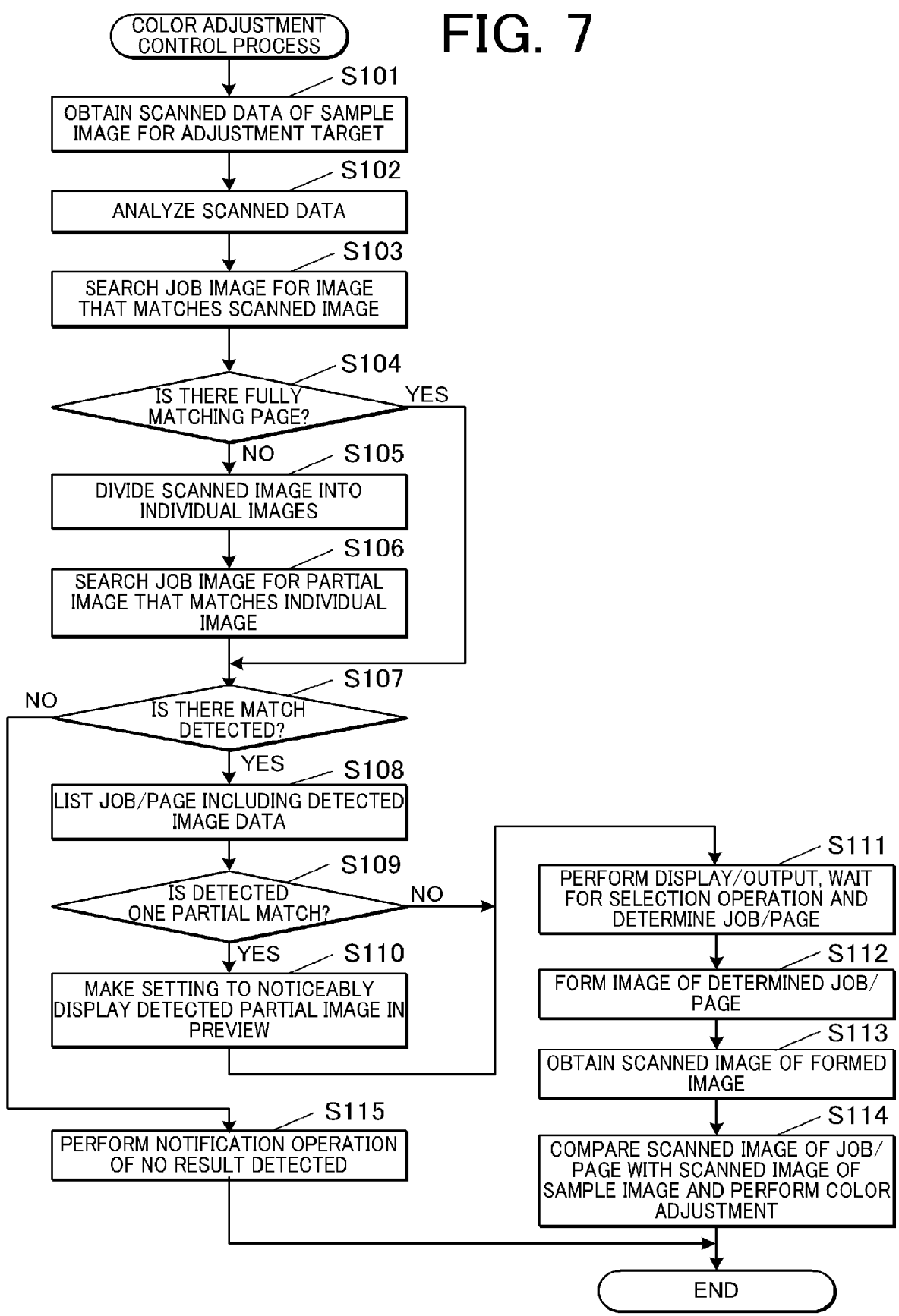
FIG. 7 is a flowchart illustrating the control procedure of a color adjustment control process that is performed by the search server.

FIG. 7 is a flowchart illustrating the control procedure of a color adjustment control process that is performed by the processing system 100 of the present embodiment. This control process is performed by, for example, the CPU 31 of the search server 3 and the CPU 21 of the print server 2.

The color adjustment control process including the processing method of the present embodiment is started by the search server 3, for example, when the CPU 31 determines that the operation receiving section 35 has received an input operation related to a request to start the color adjustment control process from a user.

When the color adjustment control process is started, the CPU 31 obtains scanned data of a sample image for a correction (color adjustment) target image (image desired by the user) (Step S101). Note that when reading and imaging are performed in the image forming apparatus 1 and the scanned data is transmitted to the search server 3, the scanned data may be transmitted to the print server 2 too. Alternatively, the scanned data may be transmitted to the print server 2 from the search server 3 after a color adjustment target is determined (Step S111 described later). The CPU 31 analyzes the scanned data to extract the contour(s) of an image(s) included therein and obtains characteristics such as the shape of the contour and the size and the color tone in the contour (Step S102).

The CPU 31 compares each page image of each job data stored in the print server 2 and the data storage apparatus 4 with the obtained scanned image I0. As a result of the comparison, the CPU 31 extracts (detects), as a match(es), a page image(s) having the degree of similarity to the scanned image I0 satisfying a predetermined criterion (Step S103).

The CPU 31 determines whether or not there is a page image(s) that matches (fully matches) the scanned image I0 (Step S104). If it is determined that there is a fully matching page image (Step S104; YES), the process of the CPU 31 proceeds to Step S107.

If it is determined that there is no fully matching page image detected (Step S104; NO), the CPU 31 separates the scanned image I0 as the individual images I0a to I0c for the respective contours separated from each other, and also divides the characteristic information (Step S105). For each page of each job image, the CPU 31 performs the partial search in which partial images included in each page are compared with the individual images I0a to I0c to search for a partially matching page image(s) (Step S106). Then, the process of the CPU 31 proceeds to Step S107.

In Step S107, the CPU 31 determines whether or not there is a matching image(s) detected (Step S107). If it is determined that there is no matching image (job/page data) detected (Step S107; NO), the CPU 31 performs a predetermined notification operation of notifying no result (match) detected (Step S115). The notification operation may be, for example, displaying characters/letters or a mark indicating the above fact by/on the display part 36. In addition to or instead of this, the notification operation may be outputting sound or the like. In this case, the image and/or operability of the "Next" button may be changed such that the user cannot perform a selection operation on the "Next" button. Then, the CPU 31 ends the color adjustment control process.

If it is determined that there is a matching mage(s) detected (Step S107; YES), the CPU 31 lists a job(s)/page(s) including the image(s) detected as a matching image(s) (Step S108). The CPU 31 determines whether or not a/each listed page is a partial match in the partial search (Step S109). If it is determined that the page is a partial match (Step S109; YES), the CPU 31 makes a setting of adding an indication to make a partial image(s) by which the page is determined as a match noticeable, to the preview of the page image included in the listed contents (Step S110). Then, the process of the CPU 31 proceeds to Step S111. In Step S109, if it is determined that the page detected is not a partial match (but a full match) (Step S109; NO), the process of the CPU 31 proceeds to Step S111.

In Step S111, the CPU 31 causes the display part 36 to display the listed contents. The CPU 31 then waits for a selection operation to be received by the operation receiving section 35 for one of the display contents on the display part 36 (Step S111). The CPU 31 determines a job/page to select from the list as a color adjustment target in response to a selection operation (Step S111). The CPU 31 causes the print server 2 to transmit the image data (selected data) of the image of the determined job/page and job settings to the image forming apparatus 1. Thus, the CPU 31 leaves the subsequent steps of the color adjustment control process to the CPU 21 of the print server 2. The CPU 21 of the print server 2 causes the image forming apparatus 1 to form an image in accordance with the selected data (Step S112). The CPU 21 causes a reading apparatus to read (scan) the formed image to generate scanned data (Step S112). Note that in order to prevent inexact color adjustment due to difference in reading characteristics, it is preferable that the reading apparatus that reads the sample image and the reading apparatus that reads the formed image be the same.

The CPU 21 obtains the scanned data (second read data) of the formed image from the image forming apparatus 1 (Step S113). The CPU 21 compares the scanned image related to the obtained scanned data of the job/page with the scanned image of the sample image obtained at the beginning or together with the selected data, and performs color adjustment on the selected data based on the result of the comparison (Step S114). The CPU 21 then ends the color adjustment control process.

Figure 8:
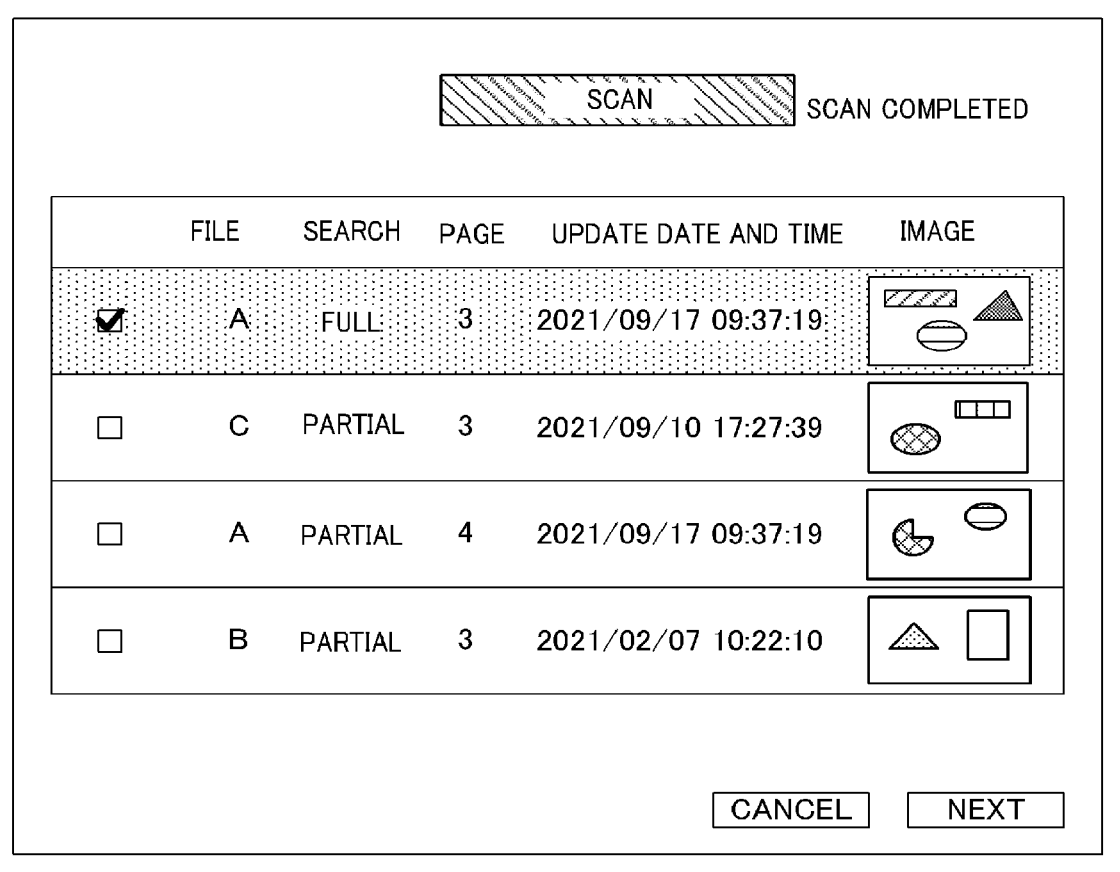

FIG. 8 illustrates an example of the display screen where the result of the full search and the results of the partial search based on the file images shown in FIG. 3 are simultaneously displayed.

As described above, the results that are partial matches may be displayed in the list together the result that is a full match from the beginning, or the results that are partial matches may be displayed in addition to the result that is a full match in response to a predetermined input operation on the operation receiving section 35 or the like.

In such a case, whether each match is a full match or a partial match may also be displayed, so that the user can further know the degree of matching. The image of Page. 3 of File. A shown at the uppermost row is determined as a match in the full search as described above, so that it is described that the search category is "full" search. A match in the full search is a full (exact) match in the partial search too as described above.

The other three pages displayed as search results are each determined as a partial match in the partial search. A setting is made to display these search results together with an indication "partial" as those each having the degree of similarity being relatively high as a result of the comparison in the partial search. As described above, results of the full search and the partial search may be simultaneously displayed from the beginning no matter whether a result of the full search has been detected or not, or results of the partial search may be additionally displayed to a result(s) of the full search in response to a predetermined input operation by the user or the like. In these cases, the display priority may be given to a match (similarity) in the full search over a match (similarity) in the partial search.

FIG. 9 is a flowchart illustrating another example of the color adjustment control process.

In the color adjustment control process of this example, as compared with the color adjustment control process shown in FIG. 7, the position of Step S104 is changed, Step S108 is divided into Steps S108a and S108b, Step S109 is deleted, Step S111 is divided into Steps S111a to S111c, and Step S121 is added. The other processes (steps) are the same as those shown in FIG. 7 and denoted by the same step numbers as those in FIG. 7, and their detailed descriptions will be omitted.

After Step S103, the process of the CPU 31 proceeds to Step S105. Further, if Step S107 is YES, then Step S104 is performed.

In Step S104, if it is determined that there is a fully matching file/page (Step S104; YES), the CPU 31 lists a job/page including the fully matching page image (Step S108a). At this time, the CPU 31 may set a flag or the like in association with the job/page so that the "full match" is noticeable as shown in FIG. 8. The CPU 31 obtains the content of an input operation received by the operation receiving section 35 (Step S111*a*). The CPU 31 determines whether or not the received content is a request to display results that are partial matches (Step S121). If it is determined that the received content is not a request to display results that are partial matches (Step S121; NO), the process of the CPU 31 proceeds to Step S111*c*. Cases where the received content is not a request to display results that are partial matches may include, for example, a case where the "Next" button is selected and operated with a file/page selected.

In Step S121, if it is determined that the received content is a request to display results that are partial matches (Step S121; YES), the process of the CUP 31 proceeds to Step S108*b*. Cases where the received content is a request to display results that are partial searches may include, for example, a case where the "Next" button is selected and operated with no file/page selected. In Step S104, if it is determined that there is no fully matching file/page (Step S104; NO), the process of the CPU 31 proceeds to Step S108*b*.

In Step S108*b*, the CPU 31 lists a job(s)/page(s) including a partial image(s) (partially matching page image(s)) detected as a partial match(es) (Step S108*b*). At this time, the CPU 31 may set a flag or the like in association with the job/page so that a "partial match" is noticeable as shown in FIG. 8. If the list of the job/page including the fully matching page image has been set in Step S108*a*, the CPU 31 can additionally set the list of the job(s)/page(s) that is/are a partial match(es) without deleting the already set data.

After Step S110, the CPU 31 obtains the content of an operation received by the operation receiving section 35 (Step S111*b*). The process of the CPU 31 proceeds to Step S111*c*.

In Step S111*c*, the CPU 31 determines a job/page as a color adjustment target (Step S111*c*). The process proceeds to Step S112, and the CPU 31 leaves the subsequent processes (steps) of the color adjustment control process to the CPU 21 of the print server 2.

As described above, the processing system 100 of the present embodiment includes the search server 3 including the CPU 31 and the print server 2 including the CPU 21. The CPU 31 obtains scanned data (first read data) of a sample image for image data included in user desired job data for image formation. The CPU 31 searches job data stored as the job data 22 and/or the archive data 41 for data of a similar image to an image included in the obtained first read data to detect the data of the similar image. The CPU 31 outputs a list of the detected data of the image. The CPU 21 causes the image forming apparatus 1 to form an image based on selected data selected from the data included in the list. The CPU 21 obtains second read data of the formed image. The CPU 21 performs color adjustment on the selected data based on the first read data and the second read data.

In this way, the processing system 100 obtains in advance the first read data of the sample image, which is used later for color adjustment. The processing system 100 searches for and detect the similar (matching) image to (with) the sample image from the image data included in the held job data. Thus, the processing system 100 can greatly reduce the time and effort of the user for color adjustment and image formation and quickly obtain appropriate color-adjusted data, and proceed to image formation based thereon. Further, the processing system 100 automatically narrows images down to those having a high possibility of being the similar image. As a result, the number of images that the user needs to check is greatly reduced, so that the possibility of the user to select a wrong image can be reduced.

The CPU 31 is capable of searching for and detecting data of an image matching (satisfying a criterion of similarity to) a full image that is the whole of the obtained scanned image I0 and data including an image matching an individual image that is a part of the full image.

In this way, the processing system 100 can detect an image based on an individual image(s). Therefore, the processing system 100 can appropriately detect a job or the like designed such that an image is formed in arrangement of images therein different from that of a sample image including images.

The CPU 31 first searches for the data of the image matching the full image. In response to not detecting the data of the image matching the full image, namely having a degree of similarity to the full image satisfying a predetermined criterion, thereby being recognized as a match, the CPU 31 searches for the data including the image similar to the individual image. If there is job/page data the full image of which is a match, this job/page data is highly likely to be the one desired by the user. In such a case, the CPU 31 does not perform the partial search, so that the time taken by the CPU 31 to perform the process is reduced. The user can easily select his/her desired job/page data, thereby advancing the process for color adjustment.

Further, the CPU 31 obtains the degree of the similarity of each of the detected data of the images. The CPU 31 generates the list in descending order of the degree of the similarity. Usually, as an image is more similar to a sample image, the possibility of the image being desired data is higher. Therefore, the CPU 31 making the detected results be displayed/output in order of the degree of the similarity allows the user to easily select his/her desired job/page data.

Further, the image substantially matching (similar to) the full image may be higher than the image substantially matching (similar to) the individual image in the degree of the similarity. As described above, an image almost the same as a full image is highly likely to be an image desired by the user. Therefore, the CPU 31 making the image matching the full image be displayed/output preferentially over the image matching the individual image allows the user to easily select his/her desired job/page data.

Further, the processing system 100 includes the operation receiving section 35 that receives an input operation. The CPU 31 determines the selected data in accordance with the content of the input operation received by the operation receiving section 35. As described above, in particular in a case where one matching image is detected in the full search, the possibility of false detection is low. However, the CPU 31 determining the selected data in the end after receiving selection approval from the user prevents/reduces occurrence of futility, such as color correction on an image included in page data of an incorrect job, in the case of the partial search too.

Further, the CPU 31 performs a predetermined notification operation of notifying no detected data in response to not detecting the data of the similar image having a degree of the similarity satisfying a predetermined criterion. When desired job/page data is not detected, there is a possibility that the job/page data is not transmitted in the first place or the sample image is not a correct one. Therefore, the CPU 31 actively performing the notification operation allows the user to quickly check these possibilities.

Further, the processing system 100 includes the image forming apparatus 1 that forms a color-adjusted image with the CPU 21. That is, the processing system 100 can appropriately adjust colors so as to be suitable for image formation in the (certain) image forming apparatus 1.

Further, as the processing apparatus of the present embodiment, a CPU (e.g., CPU 31) of an apparatus into which the print server 2 and the search server 3 are integrated may perform all the operations (processes/steps) that are performed by the CPU 21 and the CPU 31 described above. The processing apparatus having such a configuration obtains in advance first read data of a sample image, which is used for color adjustment later, and searches image data included in held job data for a similar (matching) image to (with) the sample image to detect the image. Thus, the processing apparatus can greatly reduce the time and effort of the user for color adjustment and image formation and quickly obtain appropriate color-adjusted data, and proceed to image formation based thereon. In addition, since one of the CPUs performs all the operations (processes/steps), it is unnecessary to hand over these, so that it is easy to manage the control procedure or the like.

Further, the processing method of the present embodiment includes obtaining scanned data (first read data) of a sample image for image data included in user desired job data for image formation, searching job data stored as the job data 22 and/or the archive data 41 for data of a similar image to an image included in the obtained first read data to detect the data of the similar image, outputting a list of the detected data of the similar image, causing an image forming apparatus to form an image based on selected data selected from the data included in the output list, obtaining scanned data (second read data) of the formed image, and performing color adjustment on the selected data based on the first read data and the second read data.

According to this processing method, the first read data of the sample image, which is used for color adjustment later, is obtained in advance. The processing method includes searching for and detecting the similar (matching) image to (with) the sample image included in the held job data. Therefore, it is possible to greatly reduce the time and effort of the user for color adjustment and image formation and quickly obtain appropriate color-adjusted data. As a result, the image forming process can be started quickly.

Further, by installing the program 331 for the above processing method in a computer and executing it in the form of software eliminates necessity of a special hardware component. In the program 331, the scanned data that is used for color adjustment is also used, as it is, to detect a desired image included in a plurality of (in particular, a large amount of) obtained job data. Therefore, the selected data can be easily determined, and color adjustment on the selected data can be performed.

Note that the present disclosure is not limited to the above embodiment, and various modifications can be made.

For example, although in the above embodiment, the partial search can be performed, this is not a limitation. Only the search for a full match(es) may be able to be performed. In this case, for example, the range of similarity for a full match may be set to be wider than that in the above embodiment. An image having a great difference in part or the like may be acceptable, and the image may be extracted.

Further, the predetermined criterion for similarity determination to be satisfied may be different between the full search and the partial search.

Further, the dividing process into partial images related to the partial search may not be performed at the timing shown in the above embodiment. For example, partial images of a job may be generated at the timing when the first search is performed after the job is obtained. Alternatively, partial images of job data whose partial images have not been obtained may be generated periodically, for example, at a predetermined time or the like.

Further, the priority for the output order (display order) of match data may not be determined in particular. Match data may be arranged simply in order of being detected as match data in search. Alternatively, job data may be arranged in order of date of being obtained. Alternatively, job data determined as a full match(es) may be displayed on the top, and the priority for the display order of job data determined as partial matches may not be determined.

In the above embodiment, if no matching image is found by the search(es), a certain notification operation is performed. However, if the user can know that no matching image has been found, a direct notification operation may not be performed. For example, if there is no content displayed in the list with "Search Completed" displayed, the user can indirectly understand that no matching image has been found.

In the above embodiment, the list data of the jobs/pages extracted as matching images is displayed on the display part 36, and a selection operation is received by the operation receiving section 35 for one of the displayed list data, but this is not a limitation. The display image data may be output to and displayed on an external apparatus, and the content of a selection operation received by an operation receiving section of the external apparatus, a peripheral apparatus or the like may be received via the communication section 34 to determine the selected data.

Further, in the above embodiment, in addition to the job data 22 in the print server 2, the job data as the archive data 41 in the data storage apparatus 4 is also searched, but the archive data 41, based on which images have been formed, may not be searched.

Further, in the above embodiment, the data storage apparatus 4 stores the job data based on which images have been formed, but this is not a limitation. For example, job data received by the print server 2 but not immediately to be subjected to image formation may be transmitted to the data storage apparatus 4 at an appropriate timing (at appropriate time intervals) or the like to be stored therein. In this case, when those including the archive data 41 are searched, and job data as a color adjustment target is identified as described above, the job data may be returned from the data storage apparatus 4 to the print server 2. The returned job data is subjected to processing such as color adjustment and then transmitted to the image forming apparatus 1 to be used for image formation.

Further, in the above embodiment, the processes (steps) related to detection of job/page data are performed in the search server 3, and thereafter the processes (steps) related to color adjustment for an image based on the detected data are performed in the print server 2. However, these processes may be distributed to and performed by another/other processing apparatus(es). For example, the process(es) for determining a color adjustment target may be distributed to and performed by a plurality of processing apparatuses or the like. For example, the search server 3 may transmit scanned data of a sample image to the print server 2 and the data storage apparatus 4 to cause these apparatuses to search job data that they respectively store and hold. The search server 3 performs integration, determination (judgement), output, and determination (decision) processes of results obtained from the apparatuses.

In the above, the computer-readable medium that stores the program 331 for the color adjustment control of the present disclosure is the storage section 33 including a nonvolatile memory such as an HDD and/or a flash memory, but is not limited thereto. The computer-readable medium may be, for example, another nonvolatile memory such as an MRAM or a portable recording medium such as a CD-ROM or a DVD. As a medium for providing the data of the program of the present invention via a communication line, a carrier wave is also applied to the present disclosure.

In addition, the specific configuration/components, contents and procedure of the processes/operations and so forth described in the above embodiment can be appropriately changed without departing from the scope of the present disclosure. The scope of the present invention includes the scope of the invention described in the claims and the equivalent scope thereof.

Although some embodiments of the present disclosure have been described and illustrated in detail, the disclosed embodiments are made for purposes of not limitation but illustration and example only. The scope of the present disclosure should be interpreted by terms of the appended claims.

The invention claimed is:

1. A processing system comprising a hardware processor that:
   obtains first read data of a sample image for image data included in user desired job data for image formation;
   searches job data stored in a storage section for data of a similar image to an image included in the obtained first read data to detect the data of the similar image;
   outputs a list of the detected data of the similar image;
   causes an image forming apparatus to form an image based on selected data selected from the data included in the list;
   obtains second read data of the formed image; and
   performs color adjustment on the selected data based on the first read data and the second read data.

2. The processing system according to claim 1, wherein the hardware processor is capable of searching for and detecting, as the data of the similar image, data of an image similar to a full image of the obtained first read data and data including an image similar to an individual image that is a part of the full image.

3. The processing system according to claim 2, wherein the hardware processor
   searches for the data of the image similar to the full image, and
   searches for the data including the image similar to the individual image in response to not detecting the data of the image similar to the full image having a degree of the similarity satisfying a predetermined criterion.

4. The processing system according to claim 1,
   wherein the detected data of the similar image includes data of similar images, and
   wherein the hardware processor
      obtains a degree of the similarity of each of the data of the similar images, and
      generates the list in descending order of the degree of the similarity.

5. The processing system according to claim 2,
   wherein the detected data of the similar image includes data of similar images,
   wherein the hardware processor
      obtains a degree of the similarity of each of the data of the similar images, and
      generates the list in descending order of the degree of the similarity, and
   wherein the image similar to the full image is higher than the image similar to the individual image in the degree of the similarity.

6. The processing system according to claim 1, further comprising an operation receiving section that receives an input operation,
   wherein the hardware processor determines the selected data in accordance with a content of the input operation received by the operation receiving section.

7. The processing system according to claim 1, wherein the hardware processor performs a predetermined notification operation of notifying no detected data in response to not detecting the data of the similar image having a degree of the similarity satisfying a predetermined criterion.

8. The processing system according to claim 1, further comprising the image forming apparatus that forms a color-adjusted image.

9. A processing apparatus comprising a hardware processor that:
   obtains first read data of a sample image for image data included in user desired job data for image formation;
   searches job data stored in a storage section for data of a similar image to an image included in the obtained first read data to detect the data of the similar image;
   outputs a list of the detected data of the similar image;
   causes an image forming apparatus to form an image based on selected data selected from the data included in the list;
   obtains second read data of the formed image; and
   performs color adjustment on the selected data based on the first read data and the second read data.

10. A processing method comprising:
    obtaining first read data of a sample image for image data included in user desired job data for image formation;
    searching job data stored in a storage section for data of a similar image to an image included in the obtained first read data to detect the data of the similar image;
    outputting a list of the detected data of the similar image;
    causing an image forming apparatus to form an image based on selected data selected from the data included in the list;
    obtaining second read data of the formed image; and
    performing color adjustment on the selected data based on the first read data and the second read data.

11. A non-transitory computer-readable storage medium storing a program that causes a computer to:
    obtain first read data of a sample image for image data included in user desired job data for image formation;
    search job data stored in a storage section for data of a similar image to an image included in the obtained first read data to detect the data of the similar image;
    output a list of the detected data of the similar image;
    cause an image forming apparatus to form an image based on selected data selected from the data included in the list;
    obtain second read data of the formed image; and
    perform color adjustment on the selected data based on the first read data and the second read data.

* * * * *